US010230804B2

United States Patent
Guo et al.

(10) Patent No.: US 10,230,804 B2
(45) Date of Patent: Mar. 12, 2019

(54) MONITORING SYSTEM FOR TRACKING USER ACTIVITIES FOR COMPLETING THOUGHTS, IDEAS, OR TASKS OF THE USER

(71) Applicant: International Business Machines Corporation, Amonk, NY (US)

(72) Inventors: Shang Q. Guo, Cortlandt Manor, NY (US); Jonathan Lenchner, North Salem, NY (US); Maharaj Mukherjee, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 14/740,621

(22) Filed: Jun. 16, 2015

(65) Prior Publication Data
US 2016/0373539 A1    Dec. 22, 2016

(51) Int. Cl.
| | |
|---|---|
| G06F 17/30 | (2006.01) |
| H04L 29/08 | (2006.01) |
| G06Q 10/06 | (2012.01) |
| H04M 1/725 | (2006.01) |

(52) U.S. Cl.
CPC ............ *H04L 67/22* (2013.01); *G06Q 10/06* (2013.01); *H04M 1/72563* (2013.01)

(58) Field of Classification Search
USPC ........................................................ 707/738
See application file for complete search history.

(56) References Cited

U.S. PATENT DOCUMENTS

| | | | |
|---|---|---|---|
| 6,349,287 B1* | 2/2002 | Hayashi ........... | G06Q 10/06316 700/103 |
| 8,209,701 B1* | 6/2012 | Roytman .............. | G06F 9/5027 718/106 |
| 2004/0133889 A1* | 7/2004 | Colle ..................... | G06Q 10/06 718/100 |
| 2004/0158568 A1* | 8/2004 | Colle ..................... | G06Q 10/06 |
| 2005/0289168 A1* | 12/2005 | Green ................. | G06F 17/3064 |

(Continued)

OTHER PUBLICATIONS

Ahern, "The Effect of Window State on User Behavior in an On-Line Computer Mediated Conference", CSCL '95 Proceedings, Oct. 1995, pp. 1-7.

(Continued)

*Primary Examiner* — Cam Linh T Nguyen
(74) *Attorney, Agent, or Firm* — Reza Sarbakhsh (57) ABSTRACT

A computer-implemented method for tracking the beginning and completion of tasks and nesting of sub-tasks, of the tasks, of a plurality of users, based opening and closing of applications or documents of the tasks, across a plurality of devices, based on activities of the tasks, of the plurality of users, is provided. The computer-implemented method includes receiving at least one input into at least one of the devices, wherein the received at least one input comprises the beginning or the completion of one of the tasks or nesting of sub-tasks, of one the tasks, determining one of the opened applications and documents, or topics associated with the opened applications and documents, that are connected with the inputs of the plurality of devices and, classifying the topics and sub-topics into a hierarchy, based on topics and processing time of the applications and documents.

9 Claims, 5 Drawing Sheets

(56) References Cited

U.S. PATENT DOCUMENTS

| | | | |
|---|---|---|---|
| 2007/0067772 A1* | 3/2007 | Bustamante | G06Q 10/06 718/100 |
| 2007/0276715 A1 | 11/2007 | Beringer et al. | |
| 2008/0127041 A1* | 5/2008 | Gura | G06Q 10/06 717/101 |
| 2008/0215826 A1* | 9/2008 | Markova | G06F 9/5016 711/154 |
| 2008/0313281 A1* | 12/2008 | Scheidl | G06Q 10/10 709/205 |
| 2009/0281865 A1* | 11/2009 | Stoitsev | G06Q 10/06 705/7.22 |
| 2010/0057757 A1* | 3/2010 | Blondi | G06Q 10/10 707/E17.009 |
| 2010/0287512 A1* | 11/2010 | Gan | G06F 17/30572 715/854 |
| 2011/0093474 A1 | 4/2011 | Etchegoyen | |
| 2012/0311509 A1 | 12/2012 | Maggiotto et al. | |
| 2013/0103447 A1 | 4/2013 | Melander et al. | |
| 2013/0111480 A1* | 5/2013 | Cox | G06Q 10/06311 718/100 |
| 2013/0339205 A1 | 12/2013 | Vann-Adibe et al. | |
| 2013/0339980 A1* | 12/2013 | Meshar | G06F 9/544 719/312 |
| 2014/0122701 A1 | 5/2014 | Buco et al. | |
| 2014/0237626 A1 | 8/2014 | Marcus et al. | |

OTHER PUBLICATIONS

Chen et al., "iMecho: An Associative Memory Based Desktop Search System", CIKM '09, Nov. 2-6, 2009, pp. 731-740.

Kunnath et al., "An Informatics-Based Managed Learning Environment MLE for Research and Learning at UCDavis CRISP, The Instructional Systems Design ISD Approach", Proceedings of the Sixth International Conference on Advanced Learning Technologies (ICALT'06), 2006 IEEE, pp. 1-2.

Ram et al., "Open Social Learning Communities", International Conference on Web Intelligence, Mining and Semantics (WIMS-11), 2011, pp. 1-6.

Winiecki et al., "Keeping the Thread: Helping Distance Students and Instructors Keep Track of Asynchronous Discussions", Proceedings of the Annual Conference on Distance Teaching and Learning, Aug. 5-7, 1998, 10 pages.

* cited by examiner

MONITORING SYSTEM FOR TRACKING USER ACTIVITIES FOR COMPLETING THOUGHTS, IDEAS, OR TASKS OF THE USER

BACKGROUND

The present invention relates generally to the field of computing, and computing systems for monitoring and tracking user activities of a computing system, for supporting the user in follow-through and completion of thoughts, ideas, and tasks.

In a world of multitasking, and constant interruptions, and distractions, time management may be an important challenge. Often, a user starts to work on a first item on his or her computing system, but, unfortunately, gets distracted by another event or a second item and, consequently forgets to complete work on the first item. The user may also lose track of his thoughts of the first item and, may even lose track of the threads of very creative ideas, of the first item, because of constant interruptions. Multitasking, in an operating system may provide a platform for allowing the user to perform more than one computer task, but the operating system in and of itself does not facilitate task completion.

SUMMARY

In one embodiment, a computer-implemented method for tracking the beginning and completion of one or more tasks comprising of zero or more sub-tasks, of one or more of users, based opening and closing of one or more applications or documents of the tasks, across one or more devices, based on activities of the tasks, of the plurality of users, is provided. The computer implemented method includes receiving at least one input into at least one of the devices, wherein the received at least one input comprises the beginning or the completion of one of the tasks or nesting of sub-tasks, of one said tasks. The computer-implemented method further includes determining one of the opened applications and documents, or topics associated with the opened applications and documents, that are connected with the inputs of the plurality of devices. The computer implemented method further includes classifying the topics and sub-topics into a hierarchy, based on topics and processing time of the applications and documents.

In another embodiment, a computer system for tracking the beginning and completion of one or more tasks comprising of zero or more sub-tasks, of one or more of users, based opening and closing of one or more applications or documents of the tasks, across one or more devices, based on activities of the tasks, of the plurality of users, is provided. The computer system includes one or more processors, one or more computer-readable memories, one or more computer-readable tangible storage devices and program instructions which are stored on at least one of the one or more storage devices for execution by at least one of the one or more processors via at least one of the one or more memories. The computer system further includes program instructions to receive at least one input into at least one of the devices, wherein the received at least one input comprises the beginning or the completion of one of the tasks or nesting of sub-tasks, of one said tasks. The computer system further includes program instructions to determine one of the opened applications and documents, or topics associated with the opened applications and documents, that are connected with the inputs of the plurality of devices. The computer system further includes program instructions to classify the topics and sub-topics into a hierarchy, based on topics and processing time of the applications and documents.

In yet another embodiment, a computer program product for tracking the beginning and completion of tasks and nesting of sub-tasks, of the tasks, of a plurality of users, based opening and closing of applications or documents of the tasks, across a plurality of devices, based on activities of the tasks, of the plurality of users, is provided. The computer program product includes one or more processors, one or more computer-readable memories, one or more computer-readable tangible storage devices and program instructions which are stored on at least one of the one or more storage devices for execution by at least one of the one or more processors via at least one of the one or more memories. The computer program product further includes program instructions to receive at least one input into at least one of the plurality of devices, wherein the received at least one input comprises the beginning or the completion of one of the plurality of tasks or nesting of sub-tasks, of one said tasks. The computer program product further includes program instructions to determine one of the plurality of opened applications and documents, or topics associated with the opened applications and documents, that are connected with the inputs of the plurality of devices. The computer program product further includes program instructions to classify the topics and sub-topics into a hierarchy, based on topics and processing time of the applications and documents.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more specifically to a computing system for monitoring and tracking user activities in the course of their interaction with computing systems, for supporting the user in follow-through and completion of thoughts, ideas, and tasks associated with the monitored user activates.

Embodiments of the present invention provide a platform for allowing users to keep track of started tasks, pick up where they may have left off in the event of an interruption, and thereby complete more of the tasks that they start. According to at least one implementation, the invention analyzes activities across a user's one or more electronic devices, and the applications that the user uses within these devices, and, determines whether the user is (i) starting a new task (ii) returning to an already started task, (iii) extending a given task across a new application, new document within an application, or new device, and when you actually complete a task. Embodiments of the present invention include a minimalist user interface that consists of a set of nested parentheses, each new open parenthesis corresponding to a new task. For example, each parenthesis is given a unique color and the color-coding is associated with a brief textual description of the task, based on mining of the text associated with the task as the system observes the task execution by the user. For example, the users can override any part of the graphical interface, changing the nesting of tasks, removing tasks, joining two tasks, adding new ones, changing the automatic description of tasks and so on.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
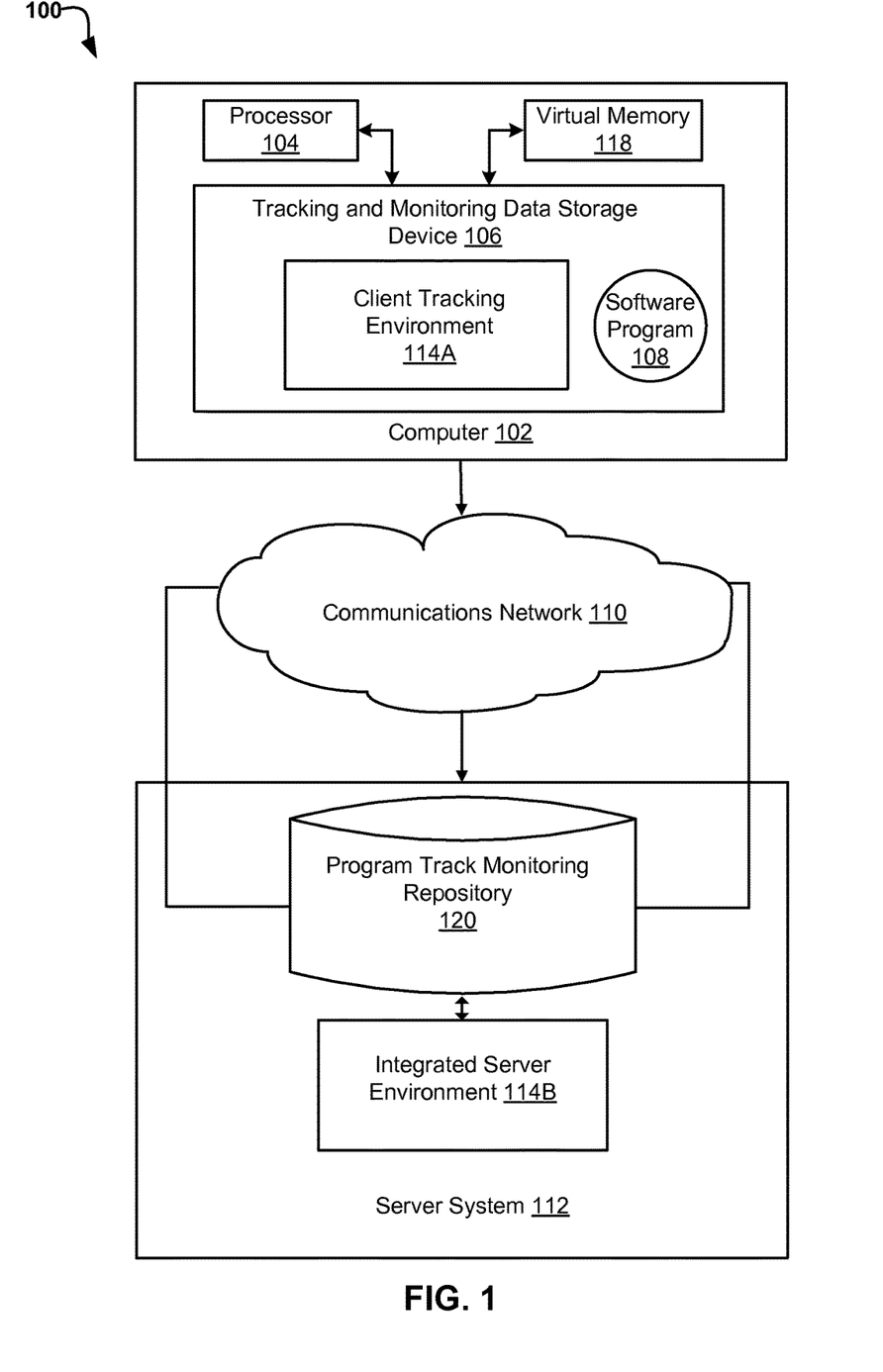
FIG. 1 illustrates a networked computer environment according to one embodiment.

Referring now to FIG. 1, a computing environment 100 for tracking, activities of a plurality of users, of a plurality of devices, whereby, activities, such as, creativity of the plurality of users, including, thoughts, ideas, or tasks, of the plurality of users, are dynamically monitored, on the devices, by tracking on-screen activities of the plurality of users on the devices, and threading and storing the tracked on-screen activities. The tracking is based on a nested parentheses mechanism, for multitasking on tasks of the device, according to embodiments, is depicted.

It should be appreciated that the computing environment 100 of FIG. 1 provides only an illustration of one implementation and, does not imply any limitations with regard to the environments in which different embodiments may be implemented. Many modifications to the depicted environments may be made based on design and implementation requirements.

The computing environment 100 may also include a plurality of computing device, including, virtual computing devices, cloud based computing devices or systems, or client-server based computing devices or systems, for tracking, activities of a plurality of users, of a plurality of devices, within the computing environment 100, only one of which is shown, at least in FIG. 1. For example, in the illustrated environment, the computing environment 100 may include a computer 102, with a processor 104 and a data storage device 106 that is enabled to run, or execute program instructions of a software program 108. The computer 102 may also include a client tracking environment 114A, for managing an administrative computing interface, for monitoring and tracking activities of the plurality of users and for assisting the plurality of users in the follow-through and completion of their activities.

The memory 118 of the computer 102 may comprise, for example, one or more computer-readable storage media, which may include random-access memory (RAM) such as various forms of dynamic RAM (DRAM), e.g., DDR2 SDRAM, or static RAM (SRAM), flash memory, or any other form of fixed or removable mobile computing storage medium that may be used to carry or store desired program code and program data in the form of instructions or data structures and that may be accessed by other components of the computing device 102.

The computing environment 100 may also include a server 112, running an integrated system environment 114B, and interconnected with computer 102, over communication network 110, for tracking the beginning and completion of tasks of a plurality of users, of a plurality of computers' 102 and creating a nest of sub-tasks, such as, as obtained by monitoring the interrupts during a task, for example by observing a user opening and closing applications during the tasks, and/or opening and closing documents across the plurality of computers' and, noticing, based on the words being entered into documents or read from documents, when one task is likely to have stopped or been interrupted, and another task is likely to have begun.

The communications network 110 may also include connections, such as wired communication links, wireless communication links, or fiber optic cables. The communications network 110 may also be implemented as a number of different types of networks, including, for example, a local area network (LAN), wide area network (WAN) or a packet switched telephone network (PSTN), or some other networked system. For example, the computing environment 100 may utilize the Internet with cloud network 110 representing a worldwide collection of networks. The term "Internet" as used according to embodiments of the present invention refers to a network or networks that uses certain protocols, such as the TCP/IP protocol, and possibly other protocols such as the hypertext transfer protocol (HTTP) for hypertext markup language (HTML) documents that make up the World Wide Web (the web).

The communications network 110 may include a public switched network and/or a satellite network, or one or more networks of any kind that can provide communication links between various devices and computers connected together within a multi-service cloud management environment, for tracking the beginning and completion of tasks of a plurality of users, of a plurality of computers' 102 and integrated server environment 114B and the tracking of the beginning and completion of nested sub-tasks, such as may be obtained by monitoring of interrupts during a task or sub-task, by observing a user opening and closing applications during the tasks or sub-tasks, and/or opening and closing documents across the plurality of computers' 102 and server 112, across the communications network 110, all within, the computer environment, according to embodiments.

The client tracking environment 114A may communicate with integrated server environment 114B, running on server 112, via the cloud communication network 110, for tracking the beginning and completion of tasks of a plurality of users, of a plurality of computers' 102 and integrated server environment 112 and the monitoring of nested sub-tasks, as may be obtained by monitoring of interrupts during a task or sub-task, by observing a user opening and closing applications during the tasks or sub-tasks, and/or opening and closing documents across the plurality of computers' 102 and server 112, according to embodiments. The communications network 110 may also include connections, such as wire, wireless communication links, or fiber optic cables. As will be discussed with reference to FIG. 5, server 112 may include internal components 800 and external components 900, respectively, and computer 102 may include internal components 800 and external components 900, respectively.

The computer 102 may be, for example, a laptop, tablet, or notebook personal computer (PC), a desktop computer, a mainframe or minicomputer, or a personal digital assistant (PDA). The computer 102 can also be any portable device that provides computing, information storage and, computing retrieval capabilities, including, for example, a handheld device, or handheld computer, pocket PC, connected organizer, electronic book (eBook) reader, a personal digital assistant (PDA), a smart phone, or other portable devices, or any type of computing devices capable of accessing an administrative interface of client tracking environment 114A, via the communications network 110, for monitoring and tracking activities of the plurality of users and for assisting the plurality of users in the follow-through and completion of their activities. The database storage device 106 of computer 102 is any type of storage device, storage server, storage area network, redundant array of independent discs (RAID), cloud storage service, or any type of data storage. The database storage device 106 can also be a relational model database server for storing program instructions for displaying information pertaining to monitoring and tracking activities of the plurality of users and for assisting the plurality of users in the follow-through and completion of their activities.

The server 112 can be, for example, a mainframe server computer system such as a management server, a web server, or any other electronic device or computing system capable of transmitting data, between server 112 and computer 102, for monitoring and tracking activities of the plurality of users and for assisting the plurality of users in the follow-through and completion of their activities via the integrated server environment 114B.

The server 112 may also represent a "cloud" of computers interconnected by one or more networks, whereby, the server 112 is a primary server of a plurality of server computing systems that utilizes clustered computers, when accessed through the cloud communication network 110. For example, a cloud computing system can be an implementation of a cloud based monitoring and tracking system, for monitoring and tracking activities of the plurality of users and for assisting the plurality of users in the follow-through and completion of their activities via the integrated server environment 114B.

The program track monitoring repository 120 of server 112 is any type of storage device, is any type of storage device, storage server, storage area network, redundant array of independent discs (RAID), cloud storage service, or any type of data storage for storing information relating to management of a cloud based program monitoring and tracking system, for tracking activities of the plurality of users of computer 102. The program track monitoring repository can also be a relational model database server for storing program instructions for displaying information pertaining to monitoring and tracking activities of the plurality of users of the computing environment 100. According to embodiments, the computer 102 may communicate with the integrated server environment 114B, running on server 112, via the communications network 110, for monitoring and tracking activities of the plurality of users and for assisting the plurality of users in the follow-through and completion of their activities.

Figure 2A:
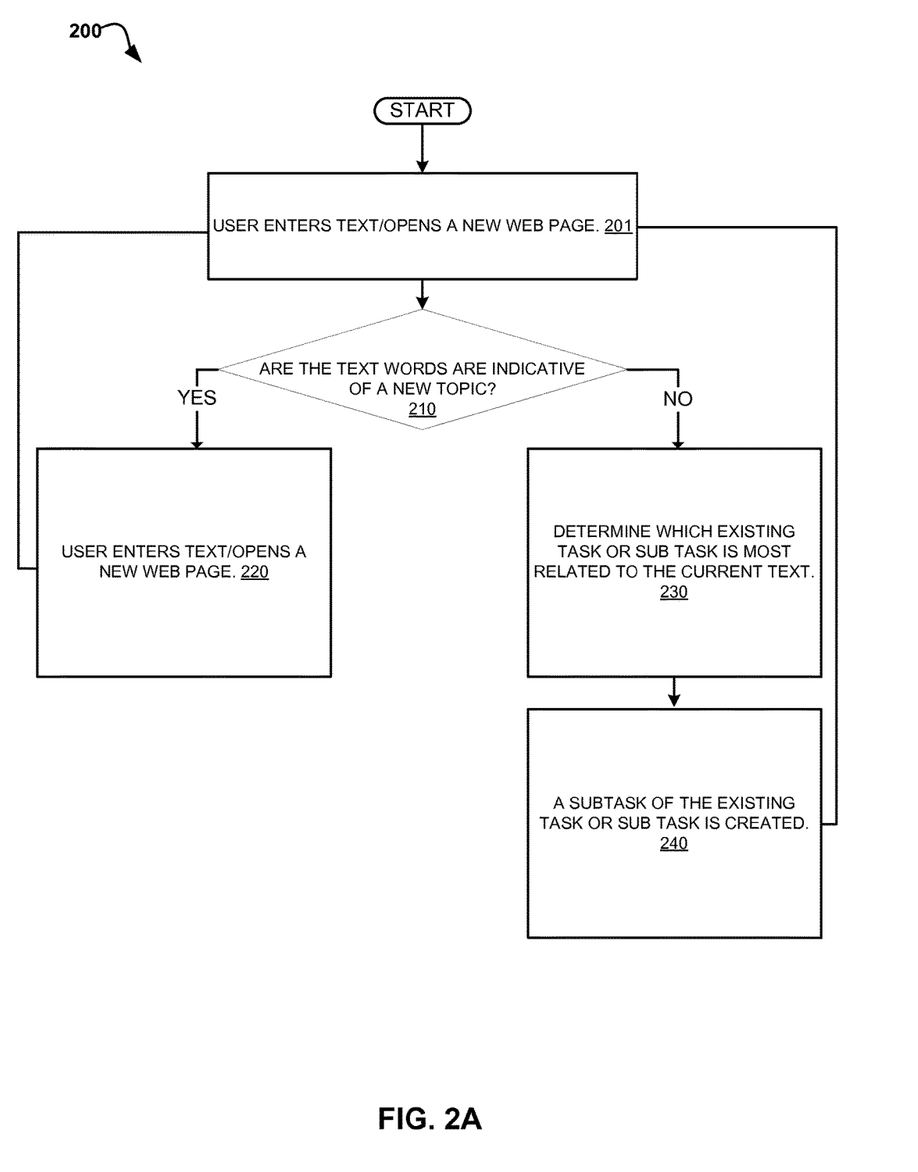
FIG. 2A-2B are operational flowcharts illustrating the steps carried out by a program of a networked computing environment.

FIG. 2A illustrates a flow diagram 200 for monitoring and tracking activities of the plurality of users, whereby a user starts a new task via an interface of computer 102 (FIG. 1), opens an application of client tracking environment 114A and, creates a new document, based on the started new task, according to embodiments.

It should be appreciated that FIG. 2A provide only an illustration of one implementation and does not imply any limitations with regard to the environments in which different embodiments may be implemented. Many modifications to the depicted environment may be made based on design and implementation requirements.

At step 201, a user of computer 102 (FIG. 1) initiates or starts to enter text in a window of client tracking environment 114A. The initiated text opens a new document or a new or web page. At step 210, integrated server environment 114B analyzes the entered text and determines whether the entered text is indicative of a new topic, whereby parenthesis are used as characters for indicating new tasks by opening an arbitrary parenthesis, indicative of a new task. If the entered text is indicative of a new topic, then, at 220, a new task is created and a new open parenthesis is added to the new task. However, if the entered text is not indicative of a new topic, then, at 230, the client tracking environment 114A determines whether an existing tasks or sub-tasks the current task is most related to. At step 240, the integrated server environment 114B creates a subtask of the existing task or sub-task.

According to one example, consider the user starts a new task within client tracking environment 114A, by opening an application at the beginning of the day on his/her laptop, such as, computer 102 (FIG. 1), and then creates a new document, within client tracking environment 114A. The document for example can be a web document, an email, a spread-sheet or any editable document within a document editor or any other similar kind. The document can also be a hyper-text document with links to other documents and resources and/or a multi-media document comprising texts, images, video, or, sound or musical components. Also consider, for example, the user types a few sentences and gives the document a title. For example, either the title is used to identify the document or the most significant words from the document are mined (e.g. by comparing the word frequencies in the document with background frequencies of words in the English language, giving, say, special weight to words occurring in the title). These words are used to provisionally identify the task.

Also, consider, for example, a task outline view is opened. The task outline view can be another document in the file system, or managed somehow separately by the operating system, such as, an application task bar of client tracking environment 114A. In this case, the highest level task appears as a highest level open parenthesis, along with the words identifying the task. The user may change these default words identifying the task as they desire. The user then either opens a new document, or opens a new application/existing application and creates another document. The content of the new document is mined to determine if there is a close match to the words in the prior document. For example, if a close match is found, the system determines that the new document is a sub-task of the original task and represents it in the task view as a new nested open parenthesis, indented with respect to the original open parenthesis.

For example, the words in this new document are again mined to provide a label for the sub-tasks, with the user able to overrule the default label and provide one of their own. If, on the other hand, the new task is not considered to be a sub-task of the highest level task, a parallel task is opened (i.e. parallel set of parentheses) and the mined name given to this highest level task. This process repeats iteratively as more and more tasks and sub-tasks are created. For example, when a document is closed the associated task or sub-task is considered to be complete, according to embodiments, as described in FIG. 2B.

Further, the user may override the placement of tasks or sub-tasks within tasks at any time. One of the following two conventions may be adhered to: A task is never closed in the nested task view until all of its sub-tasks are closed; and (ii) If a user tries to close the document associated with a parent task before all documents of the associated sub-tasks are closed, then the sub-tasks get promoted to the level of the original task. In yet another example of such a task 240 the user may by way of doing some research can open search for a document by typing some key words within a search engine. He can then proceed to either continue doing such search by typing a different set of keywords that are semantically similar to the first set until he is satisfied with the initial search, or then continue following one of the linked documents found in the first set by means of creating a collection of search results.

In yet other examples of such a task 240 the user may be editing or viewing a video, an image or an audio on a computing device, or may be performing creating a planning charts for some projects.

Figure 2B:
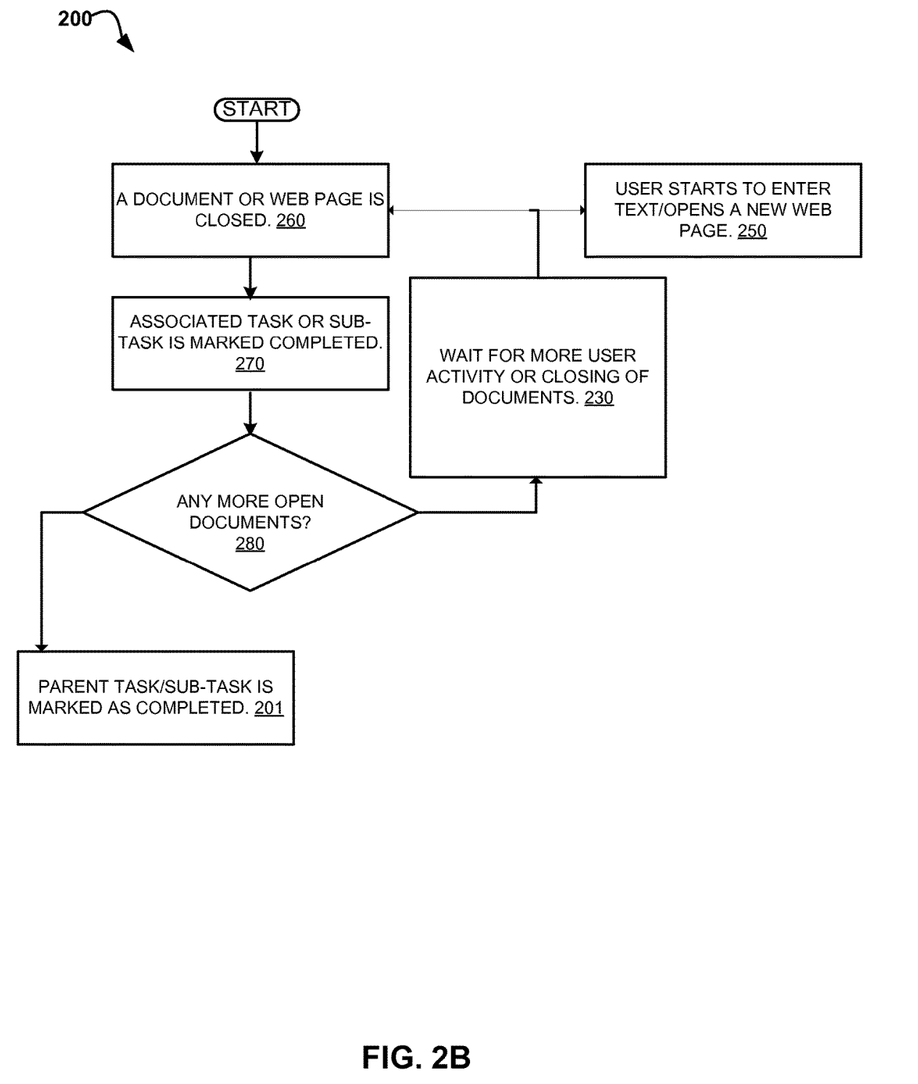

FIG. 2B illustrates a flow diagram 200 for monitoring and tracking activities of the plurality of users, whereby a user starts a new task via an interface of computer 102 (FIG. 1), closes an application of client tracking environment 114A and, closes a document, based on the an existing task, according to embodiments.

It should be appreciated that FIG. 2B provide only an illustration of one implementation and does not imply any limitations with regard to the environments in which different embodiments may be implemented. Many modifications to the depicted environment may be made based on design and implementation requirements.

At step 260 a user closes a document or web page of client tracking environment 114A. At step 270, the integrated server environment 112B marks or designates the task or sub-task as completed. At decision 280, the integrated server environment determines whether there are any more open documents for the given parent task or sub task. If there are no more open documents for the given parent task or sub-task, then at step 300, the parent task or sub-task is marked as completed. However, if there are more open documents for the given parent task or sub-task, then at step 290 the integrated server environment 114B waits for more user activity or closing of documents. If the document closes, then at step 260, the document or web page is closed. However, if the documents opens, then, a step 250, then the user starts to enter text or opens of the new web page via the integrated server environment 114B.

Figure 3:
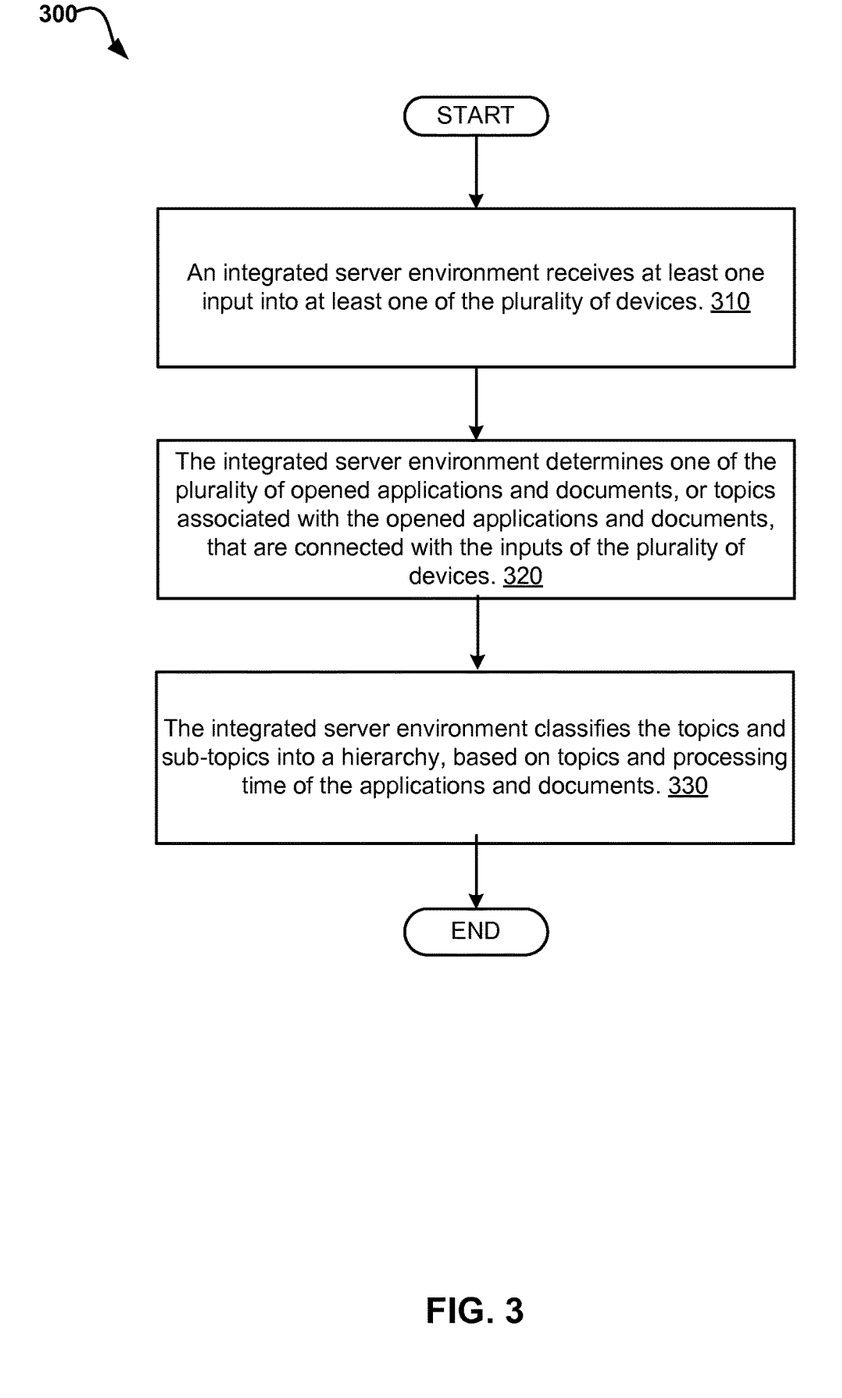
FIG. 3 is an operational flowchart illustrating the steps carried out by a program of a networked computing environment.

FIG. 3 illustrates a flow diagram of program components of the computer 102 (FIG. 1), of computing tracking environment 114A (FIG. 1), for monitoring and tracking activities of the plurality of users, according to embodiments.

It should be appreciated that FIG. 3 provides only an illustration of one implementation and does not imply any limitations with regard to the environments in which different embodiments may be implemented. Many modifications to the depicted environment may be made based on design and implementation requirements.

At step 310, the integrated server environment 114B (FIG. 1) receives at least one input into computer 102 (FIG. 1), wherein the received at least one input includes the beginning or the completion of one of the plurality of tasks or nesting of sub-tasks, of one said tasks. At step 320, the integrated server environment 114B (FIG. 1) determines one of the plurality of opened applications and documents, or topics associated with the opened applications and documents that are connected with the inputs of the computer 102 (FIG. 1). At step 330, the integrated server environment (FIG. 1) classifies the topics and sub-topics into a hierarchy, based on topics and processing time of the applications and documents. For example, according to embodiments, the hierarchy includes information about the beginning and, the completion time of each tasks, of the hierarchy that is processed or complete. Further, the inputs may include at least one of key stroke input of the computer 102 (FIG. 1), mouse clicks of the devices, voice input to the devices, and gestural inputs to computer 102 (FIG. 1). The hierarchy may be a tree of tasks and sub-tasks, or subsets of sub-tasks. For example, the tasks of the activities are tracked in a graphical user interface of the computer 102 (FIG. 1), of the plurality of users. The graphical user interface may include sets of nested characters, wherein the nested sets of characters corresponds to new sub-tasks, or subsets of sub-tasks of the computer 102 (FIG. 1).

For example, the default assumption is that the user is engaged in a single task until the user switches to a new application or new document within the client tracking environment 114A of computer 102 (FIG. 1). The opening of the initial application creates an open parenthesis of the computer 102 (FIG. 1), with a notation of the application used and a brief summary of the task as gleaned from text a client or user has entered into the document. However, if the user now goes to make a web search on the computer 102 (FIG. 1), the integrated server environment 114B (FIG. 1) performs an assessment, based on the web search terms, and resulting pages that are returned and are looked at, as to whether the searching activity of the user is related to the prior task or not of the client tracking environment 114A (FIG. 1). If the web searching activity is deemed to be part of the original task the activity is summarized within the already open parenthetical task, though given its own set of parentheses.

If, on the other hand the integrated server environment 114B (FIG. 1) deems this activity to be the beginning of a new task, the task would be given a new parenthesis at the indent level of the original task by the client, and given a new color as well. When the documents associated with a given task or sub-task are closed, the task is assumed to be completed and a closing parenthesis is added. Completed tasks are shrunk down by default to the form: {+}, where the user can click on the plus sign to see more detail. Successive browses of two different browser pages may be assigned to disparate tasks or the same task depending on the system's perception of similarity of content. As previously described, any conclusions about how tasks nest within other tasks can be overrule by the user.

In addition, if a task appears to be completed (via the user closing the associated application or document) before all of the associated subtasks are completed, the user can (according to his/her preferences) be notified by the client computer environment 114B and, can optionally mark the sub-tasks as completed, or leave them open/uncompleted. If the sub-tasks are left open they then become highest level tasks. From the outline view of tasks and subtasks a user or client can click on the activity and be taken to the associated open document. Consider, for example, handling of email and instant messaging of the client computer environment 114B. In this case, the client knowledge engine assumes that handling of email and instant messaging are each self-contained tasks, with the handling of individual emails and individual instant messages as subtasks within these master tasks. For example, the handling of an email or of an instant message can require opening web pages, documents, and so on, so these subsequent tasks can become subtasks of the larger email item or instant message item task. According to embodiment, integrated server environment 114B classifies the topics or topical information of each one of task 1, task 2, or task 3 into a hierarchy, based on topics and processing time of the applications and documents, whereby, the hierarchy includes information about the start and completion of each element of the hierarchy for reporting, via the classifier engine, tasks of a project of the devices that a in process or complete.

Though the above embodiment is depicted on a computing environment as in FIG. 1, those who are skilled in the art may appreciate that the whole implementation can also be implemented on either the client or the server itself without any changes in the methodology described in FIGS. 2A, 2B and 3.

Figure 4:
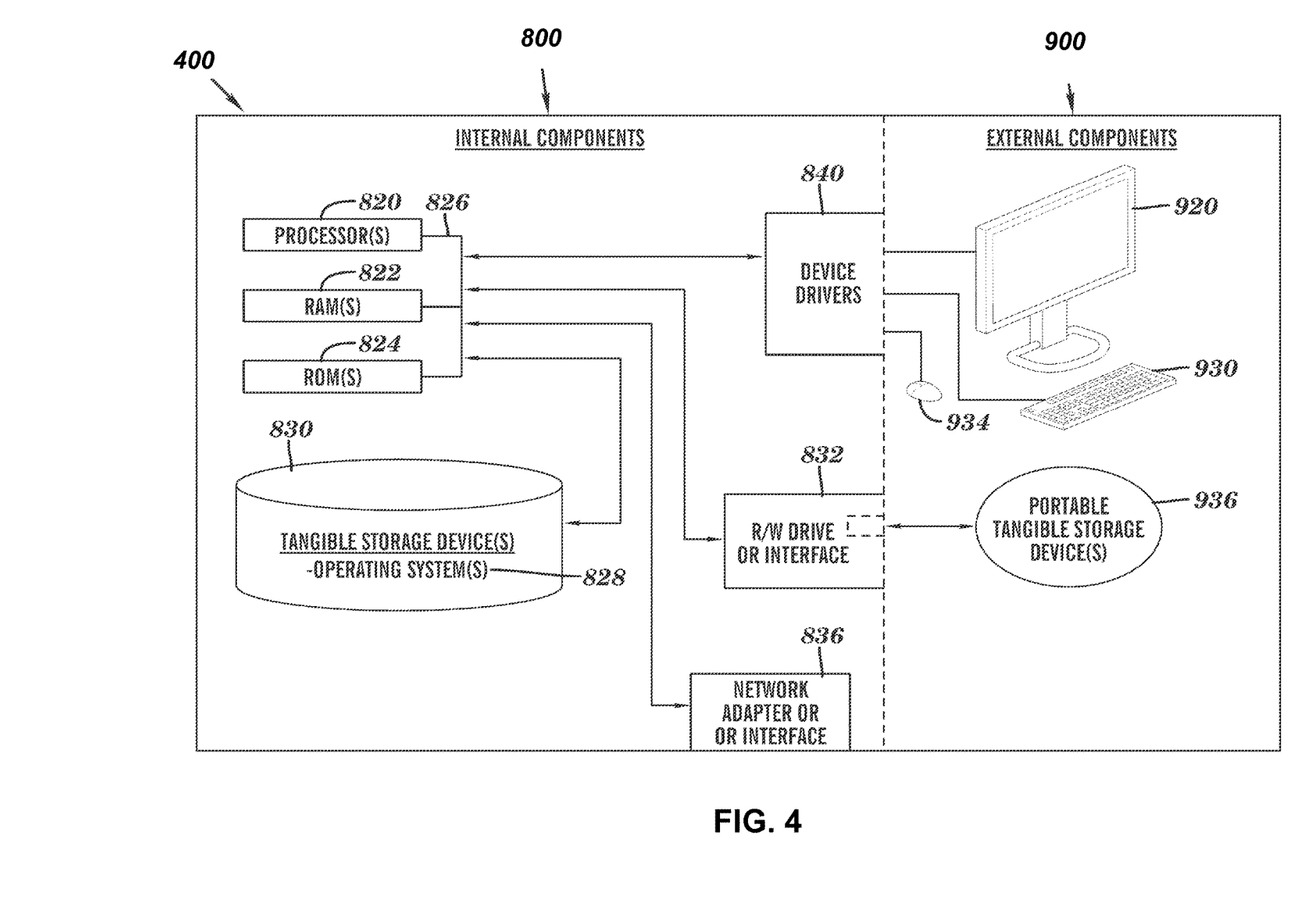
FIG. 4 is a block diagram of internal and external components of computers and servers depicted in FIG. 1 according to at least one embodiment.

FIG. 4 is a block diagram of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computer 102 114A (FIG. 1), and server system 114B (FIG. 1) include respective sets of internal components 800a, b and external components 900a, b illustrated in FIG. 4. Each of the sets of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and client tracking environment 114A (FIG. 1) in computer 102 112A and integrated server environment 114B in server system 114B in are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as client tracking environment 114A, can be stored on one or more of the respective portable computer-readable tangible storage devices 936, read via the respective R/W drive or interface 832 and loaded into the respective hard drive 830.

Each set of internal components 800a, b also includes network adapters or interfaces 836 such as a TCP/IP adapter cards, wireless Wi-Fi interface cards, or 3G or 4G wireless interface cards or other wired or wireless communication links. The client tracking environment 114A in client computer 102 112A and integrated server environment 114B in server system 114B can be downloaded to computer 102 from an external computer via a network (for example, the Internet, a local area network or other, wide area network) and respective network adapters or interfaces 836. From the network adapters or interfaces 836, the client tracking environment 114A in client computer 114A and integrated server environment 114B in server system 114B are loaded into the respective hard drive 830. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for tracking the beginning and completion of user tasks, the computer-implemented method comprising:

monitoring, by a computer, user activities on a plurality of devices, the user activities including one or more of: opening an application, closing an application, switching from one application to another application, opening a document in an application, closing a document in an application, switching from one document to another document in an application;

receiving, by the computer for the monitored user activities, one or more received times associated with the monitored user activities, the one or more received times comprising one or more of: a time an application was opened, a time an application was closed, a time the user switched from one application to another application, a time a document was opened in an application, a time a document was closed in an application, a time a user switched from one document to another document in an application, and text associated with a monitored user activity;

determining, by the computer, a topic for each received text associated with a monitored user activity;

classifying, by the computer, the monitored user activities into a hierarchy of tasks and sub-tasks, based on the received text indicating a new topic or an already determined topic, and the one or more received times associated with the monitored user activity;

generating, by the computer, a dynamic graphical user interface for displaying a hierarchy tree, based on the classified hierarchy of tasks and sub-tasks, wherein each task is indicated by an open parentheses at a first indent level followed by a description of the task, each sub-task of a task or sub-task is indicated by an open parentheses at an indent level that is one greater than the previous task or sub-task in the hierarchy tree, each closed task or sub-task is indicated by adding a close parentheses to the task or sub-task in the hierarchy tree, and a task is not considered closed until each of its sub-tasks is closed; and transmitting, by the computer to one or more of the plurality of devices, the graphical user interface for display on the one or more of the plurality of devices.

2. The computer-implemented method of claim 1, wherein the hierarchy includes information about the beginning and, the completion time of each tasks, of the hierarchy that is processed or complete.

3. The computer-implemented method of claim 1, wherein the inputs comprise at least one of key stroke input of the plurality of devices, mouse clicks of the devices, voice input to the devices, and gestural inputs to the devices.

4. A computer system for tracking the beginning and completion of user tasks, the computer system comprising:

one or more processors, one or more computer-readable memories, one or more computer-readable tangible storage devices and program instructions which are stored on at least one of the one or more storage devices for execution by at least one of the one or more processors via at least one of the one or more memories, the program instructions when executed by the at least one processor causing the computer to perform a method comprising:

monitoring, by a computer, user activities on a plurality of devices, the user activities including one or more of: opening an application, closing an application, switching from one application to another application, opening a document in an application, closing a document in an application, switching from one document to another document in an application;

receiving, by the computer for the monitored user activities, one or more received times associated with the monitored user activities, the one or more received times comprising one or more of: a time an application was opened, a time an application was closed, a time the user switched from one application to another application, a time a document was opened in an application, a time a document was closed in an application, a time a user switched from one document to another document in an application, and text associated with a monitored user activity;

determining, by the computer, a topic for each received text associated with a monitored user activity;

classifying, by the computer, the monitored user activities into a hierarchy of tasks and sub-tasks, based on the received text indicating a new topic or an already determined topic, and the one or more received times associated with the monitored user activity;

generating, by the computer, a dynamic graphical user interface for displaying a hierarchy tree, based on the classified hierarchy of tasks and sub-tasks, wherein each task is indicated by an open parentheses at a first indent level followed by a description of the task, each sub-task of a task or sub-task is indicated by an open parentheses at an indent level that is one greater than the previous task or sub-task in the hierarchy tree, each closed task or sub-task is indicated by adding a close parentheses to the task or sub-task in the hierarchy tree, and a task is not considered closed until each of its sub-tasks is closed; and transmitting, by the computer to one or more of the plurality of devices, the graphical user interface for display on the one or more of the plurality of devices.

5. The computer system of claim 4, wherein the hierarchy includes information about the beginning and, the completion time of each tasks, of the hierarchy that is processed or complete.

6. The computer system of claim 4, wherein the inputs comprise at least one of key stroke input of the plurality of devices, mouse clicks of the devices, voice input to the devices, and gestural inputs to the devices.

7. A computer program-product for tracking the beginning and completion of user tasks, the computer program product comprising:

one or more computer-readable storage media and program instructions stored on the one or more computer-readable storage media, which, when executed by a computer, cause the computer to perform a method comprising:

monitoring, by a computer, user activities on a plurality of devices, the user activities including one or more of: opening an application, closing an application, switching from one application to another application, opening a document in an application, closing a document in an application, switching from one document to another document in an application;

receiving, by the computer for the monitored user activities, one or more received times associated with the monitored user activities, the one or more received times comprising one or more of: a time an application was opened, a time an application was closed, a time the user switched from one application to another application, a time a document was opened in an application, a time a document was closed in an application, a time a user switched from one document to another document in an application, and text associated with a monitored user activity;

determining, by the computer, a topic for each received text associated with a monitored user activity;

classifying, by the computer, the monitored user activities into a hierarchy of tasks and sub-tasks, based on the received text indicating a new topic or an already determined topic, and the one or more received times associated with the monitored user activity;

generating, by the computer, a dynamic graphical user interface for displaying a hierarchy tree, based on the classified hierarchy of tasks and sub-tasks, wherein each task is indicated by an open parentheses at a first indent level followed by a description of the task, each sub-task of a task or sub-task is indicated by an open parentheses at an indent level that is one greater than the previous task or sub-task in the hierarchy tree, each closed task or sub-task is indicated by adding a close parentheses to the task or sub-task in the hierarchy tree, and a task is not considered closed until each of its sub-tasks is closed; and transmitting, by the computer to one or more of the plurality of devices, the graphical user interface for display on the one or more of the plurality of devices.

8. The computer program product of claim 7, wherein the hierarchy includes information about the beginning and, the completion time of each tasks, of the hierarchy that is processed or complete.

9. The computer program product of claim 7, wherein the inputs comprise at least one of key stroke input of the plurality of devices, mouse clicks of the devices, voice input to the devices, and gestural inputs to the devices.

* * * * *